United States Patent [19]

Krauss

[11] Patent Number: 5,136,756
[45] Date of Patent: Aug. 11, 1992

[54] CORD CLAMP WITH HASP

[75] Inventor: Mark Krauss, East Greenwich, R.I.

[73] Assignee: American Cord & Webbing Company, Inc., Woonsocket, R.I.

[21] Appl. No.: 788,586

[22] Filed: Nov. 6, 1991

[51] Int. Cl.[5] .............................................. A44B 21/00
[52] U.S. Cl. ................................ 24/265 H; 24/129 R; 24/132 R
[58] Field of Search ........... 24/265 H, 265 CD, 122.6, 24/136 R, 129 R, 130, 30.5 R, 598.1, 598.4; 403/283, 274

[56] References Cited

U.S. PATENT DOCUMENTS

| 664,814 | 12/1900 | Manes | 24/265 H |
| 751,090 | 2/1904 | Marold | 24/265 H |
| 967,664 | 8/1910 | Peterson | 24/265 H |
| 1,565,392 | 12/1925 | Powers | 24/265 H |
| 2,412,895 | 12/1946 | Lewis | 24/265 H |
| 3,896,527 | 7/1975 | Miller et al. | 24/132 R |

FOREIGN PATENT DOCUMENTS 0891022  3/1962  United Kingdom ............. 24/265 H

Primary Examiner—Victor N. Sakran
Attorney, Agent, or Firm—Kane, Dalsimer, Sullivan, Kurucz, Levy, Eisele and Richard

[57] ABSTRACT

This invention is directed toward a clamp with a hasp for fastening a cord or rope. The fastening means is a hinged component of the clamp which folds upon itself and is provided with locking means to maitain it in the folded position.

7 Claims, 1 Drawing Sheet

CORD CLAMP WITH HASP

FIELD OF THE INVENTION

This invention is directed toward a clamp with a hasp for fastening a cord or rope. The fastening means is a hinged component of the clamp which folds upon itself and is provided with locking means to maintain it in the folded position.

BACKGROUND OF THE INVENTION

Various clamps are known in the prior art. For instance, U.S. Pat. No. 4,461,059 discloses a wire clamp consisting of a U-shaped housing open on one side. On two opposed sidewalls of the housing, there is provided a plurality of fins angled backwards so that a wire entrained between the fins can be pulled in one direction, but not the other. Two arms 50, 52 are provided to insure that the wire moves laterally out of the housing. At one end, the housing is formed with an integral closed hoop 64.

U.S. Pat. No. 3,629,909 discloses a plastic wire clamp consisting of two pieces: a) U-shaped member with angled side walls, and b) an insert which is wedged into the U-shaped member. The insert has internal teeth 60 for grabbing the wire. The U-shaped member does not contact the wire itself.

Finally, U.S. Pat. No. 3,034,189 discloses a clasp for a wrist band consisting of two clamping members connected by a hinge. The hinge is disposed longitudinally in parallel with the band. On the inside surfaces, the clamping members include spikes 32 for engaging the band While the aforedescribed clamps may function to attach and to hold wires, they have certain disadvantages. They may require an insert and thus can not be of a single piece construction (U.S. Pat. No. 3,629,909) or they may not anchor a cord or rope in place since they permit the cord to be moved in at least one direction (U.S. Pat. No. 4,461,059). It is also noted that these prior art clasps may not possess means such as a hook for fastening the clasped cord to some other objects such as a wall or a post (U.S. Pat. Nos. 3,034,189 and 3,629,909).

SUMMARY OF THE INVENTION

It is an object of the invention to provide a cord clasp with hasp which fastens securely to the end of a cord, rope or the like.

It is a further object of the invention to provide a cord clasp with hasp which is provided with a means for fastening the cord clasp to another object such as a wall or post.

It is a further object to provide a cord clasp with a hasp that is of a single piece construction.

It is still a further object of this invention to provide a cord clasp with hasp which can be molded in one piece from a simple two piece mold.

Other objects of the invention shall become apparent from the following disclosure.

The invention is a cord clasp with a hasp of a single piece construction for fastening upon a cord or a rope. The hasp, or fastening means, is a hinged component of the clamp which is formed of two halves joined at a hinge so that the two are able to fold upon themselves. The two halves are provided upon their interior with means to grip and be securely fastened to the end of a rope or cord. Means are provided to lock the clamp in its folded position. The cord clamp is further provided at one end with a hook which permits the cord clasp to be fastened to some other object, such as a wall or a post.

DETAILED DESCRIPTION OF THE PREFERRED EMBODIMENT

Figure 1:
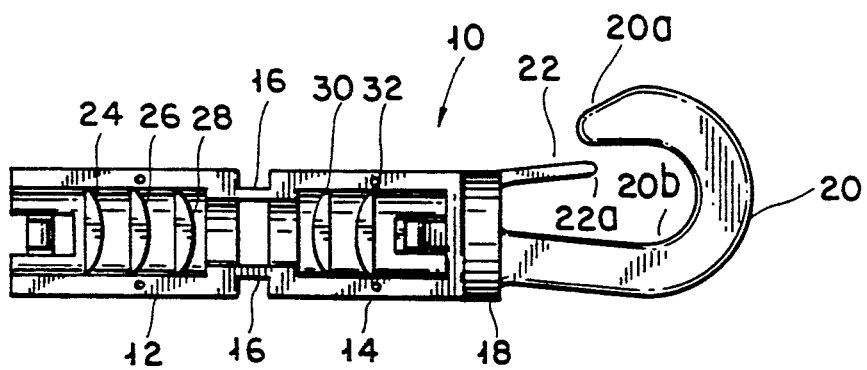
FIG. 1 is a top view of the cord clamp in its open position.
Figure 2:
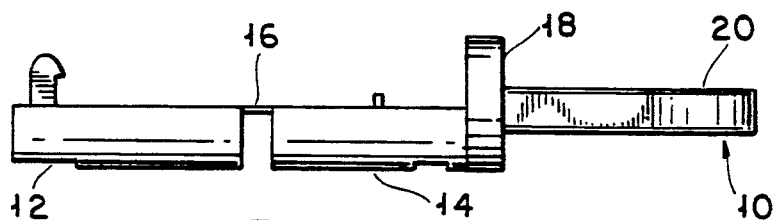
FIG. 2 is a side view of the cord clamp in its open position.
Figure 3:
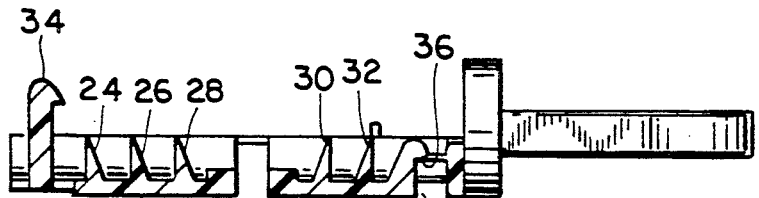
FIG. 3 is a cross-sectional side view of the cord clamp in its open position.
Figure 5:
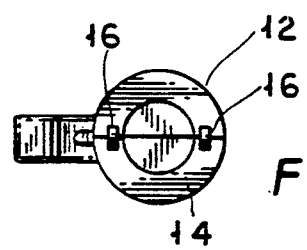
FIG. 5 is a front view of the cord clamp in its closed position.
Figure 4:
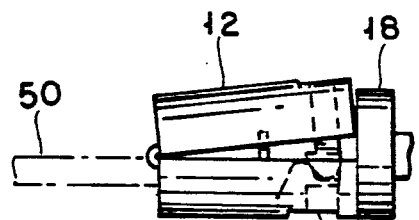
FIG. 4 is a side view of the cord clamp in its closed position.

Cord clamp with hasp 10 is comprised generally of two portions, or halves, 12 and 14 which as joined by hinges 16, which join the halves at opposite sides of the cord clasp. The hinges define an aperture therebetween through which a cord or rope can be placed into the interior of the cord clasp. The cord clasp is also comprised of a flange 18 to which is attached a hook 20 which serves as a means for attaching the cord clasp to some other object such as a wall or post. Preferably, a fastening guard 22 projects from the flange 18 at the end opposite where the hook 20 is joined to the flange 18. The fastening guard 22 projects for a distance so that its outermost end 22a projects just under the outer end of the hook 20a creating an arrangement so that an object can be placed within the interior of the hook 20b and will not come free therefrom by virtue of the presence of projecting fastening guard 22.

Projecting gripping means 24, 26, 28, 30, and 32 are located on the interior of the halves 12 and 14.

Figure 6:
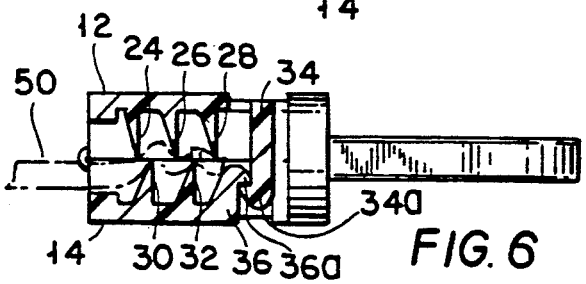
FIG. 6 is a cross-sectional side view of the cord clamp in its closed position.
Figure 7:
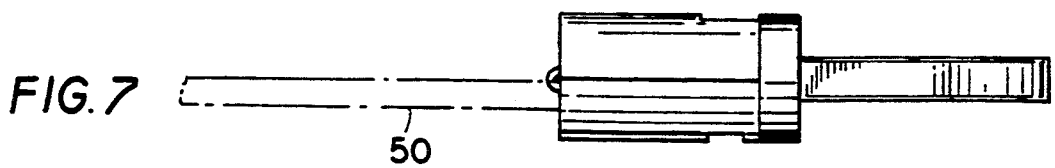
FIG. 7 is a side view of the cord clamp in its closed position.

The gripping means are arranged so that when the two halves are folded upon themselves the gripping means 24, 26, 28 are in a staggered arrangement with respect to gripping means 30 and 32 (see FIG. 6). A cord or rope 50 which is placed between the two halves will be crimped between the so staggered gripping means 24, 26, 28, 30 and 32 and would take a serpentine like path around the gripping means, which pinch the cord 50 and hold it securely in place.

The cord clasp is also provided with a locking means for locking the two halves in its folded and closed position. The locking means are provided in the form of protrusions 34, which protrudes from half 12 and protrusion 36 which protrudes from half 14. Protrusion 34 is further provided with tooth 34a and protrusion 36 is further provided with tooth 36a. When the two halves 12 and 14 are folded upon each other, the protrusions 34 and 36 engage each other by way of teeth 34a and 36a, thereby locking the cord clasp in its folded position.

The cord clasp of the present invention is of a single piece, unitary construction and preferably is constructed of thermoplastic material. It cam be molded from a simple two piece mold, which is inexpensive.

I claim:

1. A cord clasp with hasp comprised of two half portions affixed to each other by means of a hinge thereby enabling the two halves to fold upon each other into a folding position, locking means present upon the two halves for locking the two halves in a folded position; a flange affixed to one of the halves, and a hook shaped component affixed to the flange for enabling the cord clasp to be attached to a preselected object and the hinge cooperating to define an aperture through which a cord can be placed between the two halves of the cord clasp.

2. The cord clasp as set forth in claim 1 wherein the hinge is comprised of two hinge portions located at opposite sides of the halves, the two-hinge portions being located to define the aperture between the two hinge portions through which a cord can be placed between the two halves of the cord clasp.

3. The cord clasp as set forth in claim 1 wherein the two halves are comprised of gripping members for gripping a cord, the gripping members being protrusions extending from the halves and are arranged upon the halves so that when the halves are in a folded position the gripping members are in a staggered arrangement thereby gripping the cord in a crimp-like manner.

4. The cord clasp as set forth in claim 1 wherein a fastening guard projects from the flange at the end opposite from where the hook is affixed to the flange, said fastening guard projecting for a distance so that an outermost end of the fastening guard projects just under an outer end of the hook.

5. The cord clasp as set forth in claim 1 wherein the locking means is further comprised of a protrusion present upon each half, said protrusions also comprised of teeth arranged so that when the halves are in the folded position the teeth inter-engage each other, thereby locking the halves in the folded position.

6. The cord clasp as set forth in claim 1 wherein the two halve portions and hinge are of integral one-piece construction.

7. A cord clasp with hasp comprised of two halve portions affixed to each other by means of a hinge thereby enabling the two halves to fold upon each other into a folded position, the two half portions and hinge being of integral one-piece construction, locking means for locking the two halves in a folded position, and a hook shaped component affixed to the one of the halves for enabling the cord clasp to a preselected object and the hinge cooperating to define an aperture through which a cord can be placed between the two halves of the cord clasp.

* * * * *